Dec. 16, 1924.
T. C. WHITEHEAD
RIM AND SPOKE CONNECTION
Filed Jan. 10, 1921
1,519,807
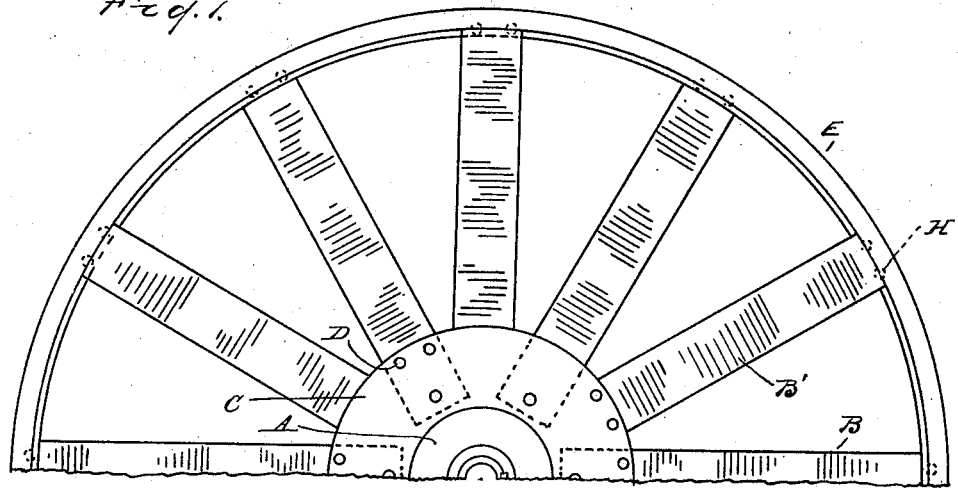
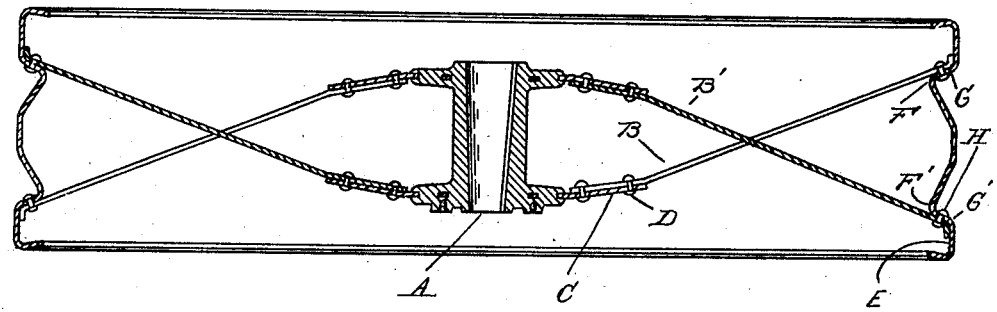
Inventor
Thomas C. Whitehead
By
Attorneys Patented Dec. 16, 1924.

1,519,807

UNITED STATES PATENT OFFICE.

THOMAS C. WHITEHEAD, OF DETROIT, MICHIGAN.

RIM AND SPOKE CONNECTION.

Application filed January 10, 1921. Serial No. 436,134.

*To all whom it may concern:*

Be it known that I, THOMAS C. WHITEHEAD, a citizen of the United States of America, residing at Detroit, in the county of Wayne and State of Michigan, have invented certain new and useful Improvements in Rim and Spoke Connection, of which the following is a specification, reference being had therein to the accompanying drawings.

The invention relates to wheels more particularly designed for use on tractors and of that type in which the spokes are formed of flat metal strips. It is the object of the invention to form a simplified and improved means of attachment between the spokes and the rim and to this end the invention consists in the construction as hereinafter set forth.

In the drawings:

Figure 1 is an elevation of part of the wheel;

Figure 2 is a cross-section thereof.

In the construction of wheels of the type above referred to it is usual to provide a hub, such as A, and preferably formed of cast metal and a series of spokes B formed of flat metal bars extending from said hub to the rim. As shown, the hub A has cast therein an annular pressed sheet metal member C, which extends beyond the periphery of the casting and forms a means for the securing of the spokes by riveting, as indicated at D.

Various methods have been employed for attaching the outer ends of the spokes to the rim, all of which have certain objections. Thus where the spoke is bent so as to have a portion lying parallel to the rim and attached thereto by riveting, this forms a point of weakness at the bend, frequently resulting in breakage. Also, where the rivets are in the tread portion of the wheel, they are exposed to wear and frequently become loose. Another method which has been used is to provide an angle fitting for the attachment of the spoke, but this both increases the cost of manufacture and adds to the weight of the structure.

The present invention overcomes the objection above referred to in a very simple way and consists in so forming the rim that a portion thereof will lie substantially parallel to the plane of the spoke and will afford a means of attachment to the latter. This attachment portion is preferably in the form of a substantially V-shaped inturned bead extending around the periphery of the rim, one face of said bead being parallel to a series of spokes. Preferably, there are two of such beads adjacent to the opposite edges of the rim for respectively attaching two series of spokes extending at angles to each other.

In detail, E is a rim which has rolled, pressed or otherwise formed therein the beads F and F', the faces G and G' of which are substantially parallel to the spokes B and B'. The spokes of the two series are extended to overlap the faces G and G' and are secured thereto by rivets H. The recess formed in the periphery of the wheel by the inturned beads will provide space for the rivet heads and will protect the latter from any contact with the ground which would be injurious thereto.

With the construction described the spokes may be very easily and quickly attached to the rim and in use the stresses will be transmitted longitudinally of the spokes throughout their entire length, while the rivets will be in shear. This is very desirable as it avoids any tendency to weaken the spoke at any one point and therefore adds to the life of the wheel. To provide for the inturned bead, the blank from which the rim is formed must be increased slightly in width, but on account of the reinforcement produced by the bead, it is possible to use a lighter gauge of metal, so that less metal in weight is used with my improved construction than is necessary with a straight section rim.

What I claim as my invention is:

1. In a wheel, a series of spokes, a rim having spaced portions of the periphery between the opposite edges thereof pressed inward and lying parallel to the respective spokes, and means securing said spokes to said inwardly extending portions.

2. In a wheel, a series of spokes, a rim having spaced circumferential corrugations, and means for securing said spokes directly against certain sides of said corrugations.

3. In a wheel, a flat rim having spaced circumferential corrugations, spokes engaging said rim and certain sides of said corrugations, and headed elements securing said spokes to said corrugations.

4. In a wheel, a rim having spaced circumferential corrugations extending inwardly in opposite directions, a plurality of spokes engaging said corrugations, said spokes having laterally extending portions bearing against the flat portions of said rim, and headed elements securing said spokes to said corrugations.

5. In a wheel, a channel-shaped rim having spaced circumferential corrugations extending inwardly in opposite directions, a plurality of spokes engaging said corrugations, and headed elements securing said spokes directly to said corrugations.

6. In a wheel, a rim, spokes secured to said rim, said rim having corrugated portions extending inwardly between said spokes, and headed elements securing said spokes directly to said corrugations.

7. In a rim and spoke connection, the combination with a plurality of spokes, of a rim having spaced portions of its periphery between opposite edges thereof placed inwardly between said spokes and lying parallel thereto, and headed elements securing said spokes to said inwardly extending portions.

In testimony whereof I affix my signature.

THOMAS C. WHITEHEAD.